United States Patent [19]
Storm

[11] Patent Number: 5,739,426
[45] Date of Patent: Apr. 14, 1998

[54] VOLUME MEASUREMENT APPARATUS AND METHOD

[76] Inventor: Thomas W. Storm, 1602 Augusta Way, Casselberry, Fla. 32707

[21] Appl. No.: 846,173

[22] Filed: Apr. 28, 1997

Related U.S. Application Data

[63] Continuation-in-part of Ser. No. 582,347, Jan. 19, 1996, Pat. No. 5,663,498.

[51] Int. Cl.$^6$ .................................................. G01B 11/28
[52] U.S. Cl. ..................................................... 73/149
[58] Field of Search .................................. 73/149; 33/1 V, 33/772, 773; 356/379, 380; 348/94, 135

[56] References Cited

U.S. PATENT DOCUMENTS

| | | |
|---|---|---|
| 3,681,747 | 8/1972 | Walsh . |
| 4,773,029 | 9/1988 | Claesson et al. . |
| 5,043,735 | 8/1991 | Mawhinney et al. . |
| 5,202,740 | 4/1993 | Kivits . |
| 5,274,271 | 12/1993 | McEwan . |
| 5,528,517 | 6/1996 | Loken ........................... 33/1 V |
| 5,572,427 | 11/1996 | Link et al. . |
| 5,661,561 | 8/1997 | Wurz et al. ..................... 356/380 |

*Primary Examiner*—Robert Raevis
*Attorney, Agent, or Firm*—Paul S. Rooy

[57] ABSTRACT

A volume measurement apparatus and method of use. The volume measurement apparatus comprises a vertical leg attached to a horizontal leg, and at least one sensor attached to the legs. A trackball is rotatably attached to the volume measurement apparatus, and is electrically connected to a trackball movement detection means. A volume measurement means is electrically connected to the trackball movement detection means and to the at least one sensor. The method of use includes the steps of rolling the volume measurement apparatus past an object whose volume is to be measured, such that the sensor(s) will scan cross sectional areas of an object embraced within the volume measurement apparatus vertical leg and horizontal leg at pre-set intervals, figuring only the area that the sensor(s) report as solid, which is the object cross section return, and summing the products of the object cross section returns multiplied by the increment. An alternative method of use involves swiveling the volume measurement apparatus such that an object being measured is encompassed within the sweep of the legs during the swiveling motion. An alternate embodiment apparatus comprises a first leg attached to a second leg, a forward-looking sensor, a sideward-looking sensor, and a rearward-looking sensor disposed at an extreme of said first leg opposite said second leg, a forward-looking sensor, a sideward-looking sensor, and a rearward-looking sensor disposed at an extreme of said second leg opposite said first leg, a forward-looking sensor, a sideward-looking sensor, and a rearward-looking sensor disposed at an intersection of said first leg and said second leg. An alternate method comprises the final step of subtracting a volume of voids detected by the forward-looking or rearward-looking sensors from the total volume measured.

17 Claims, 13 Drawing Sheets

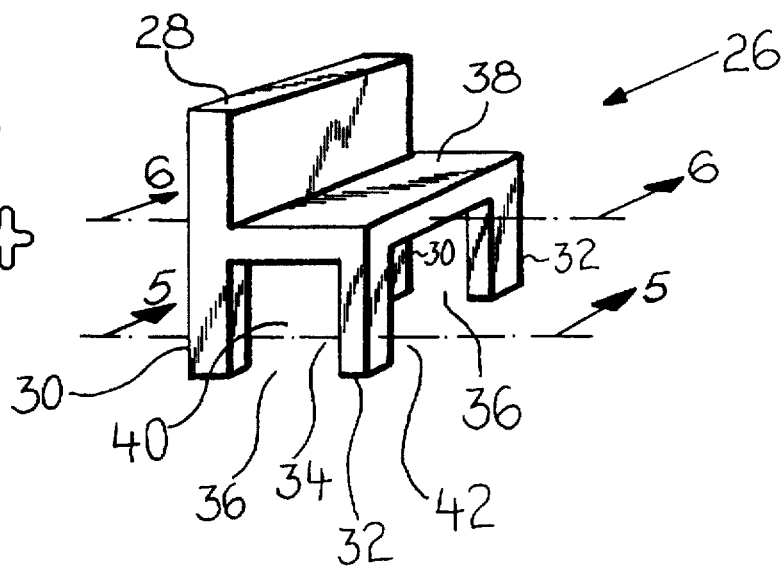
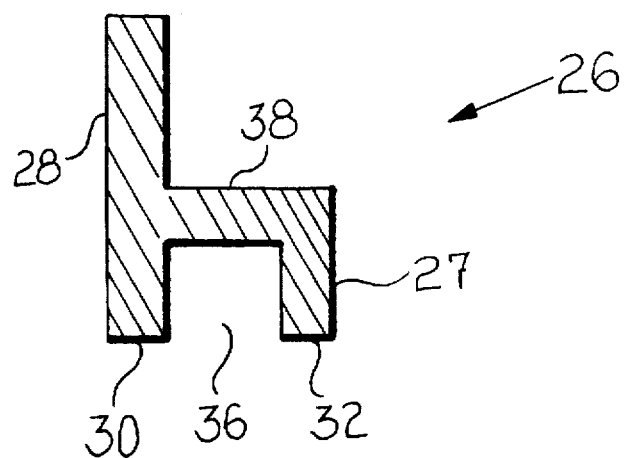
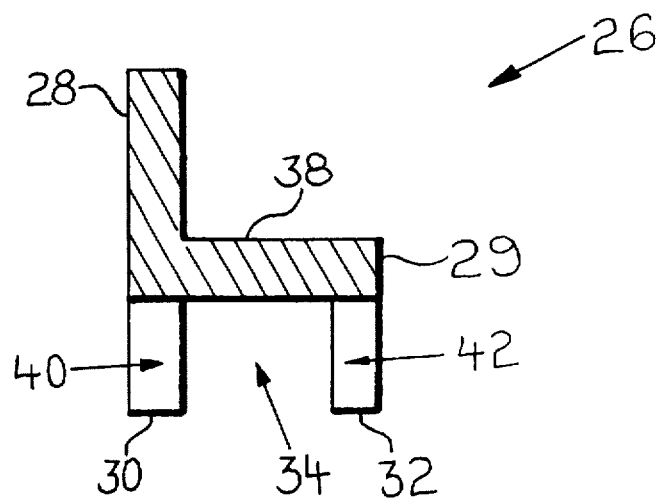

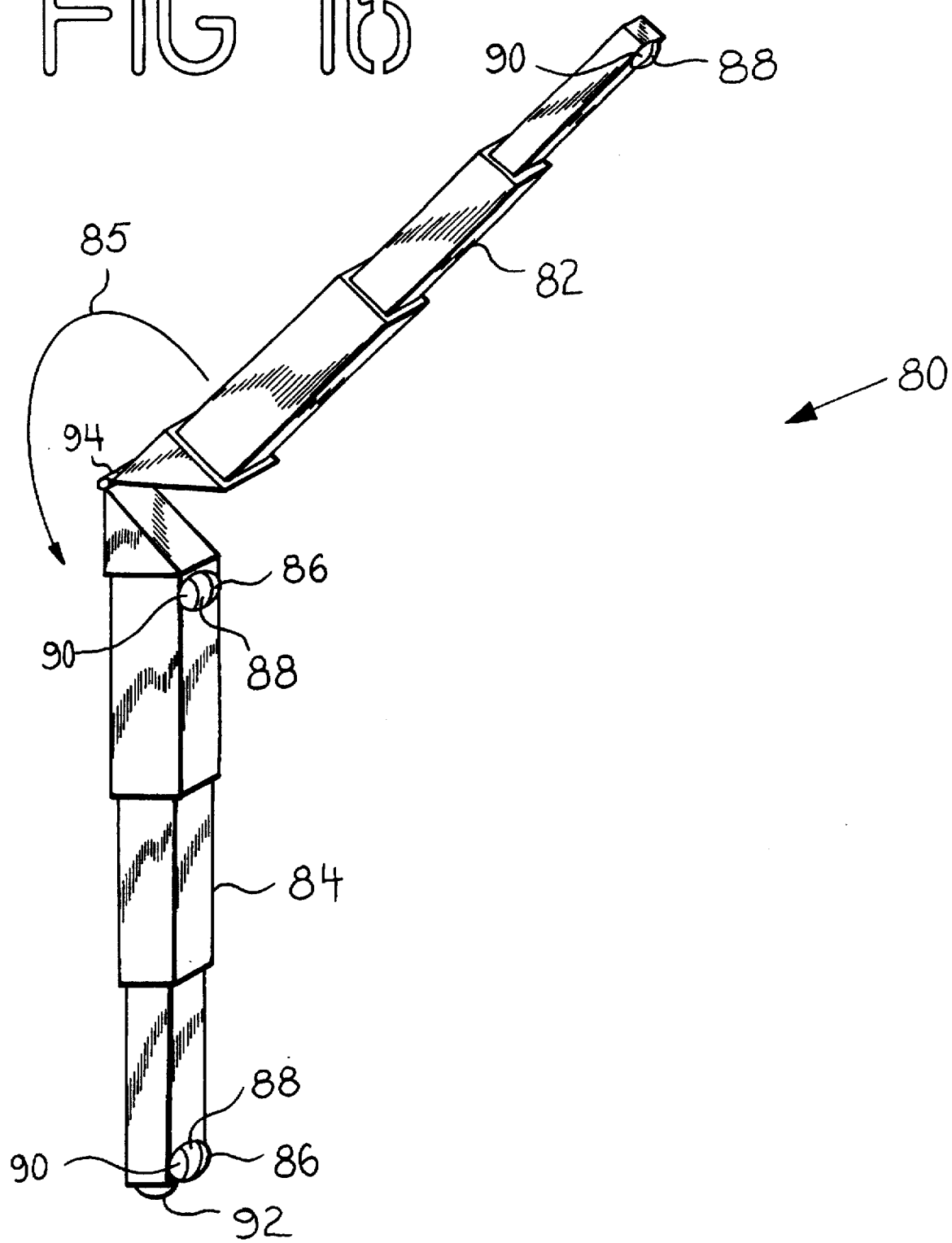

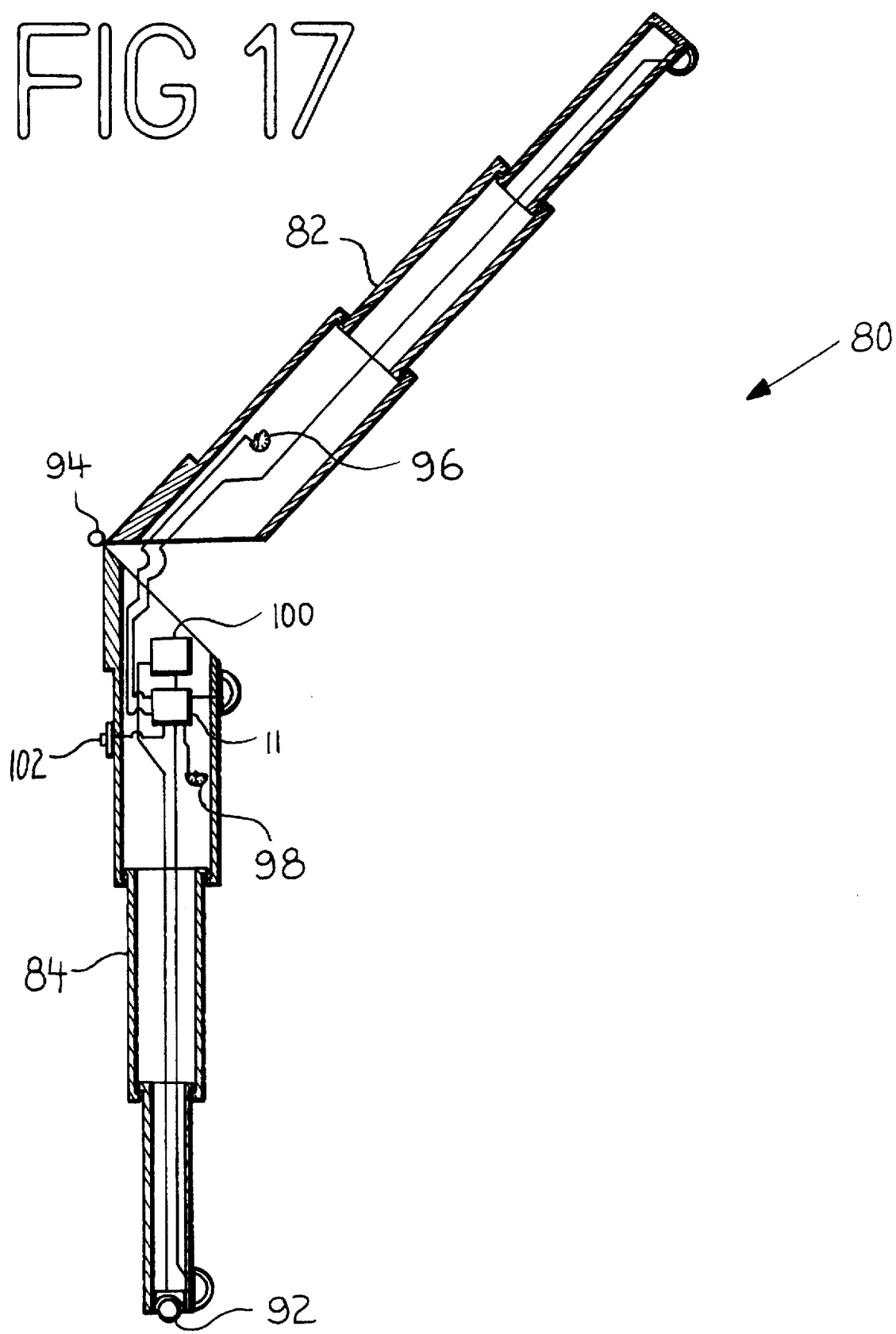

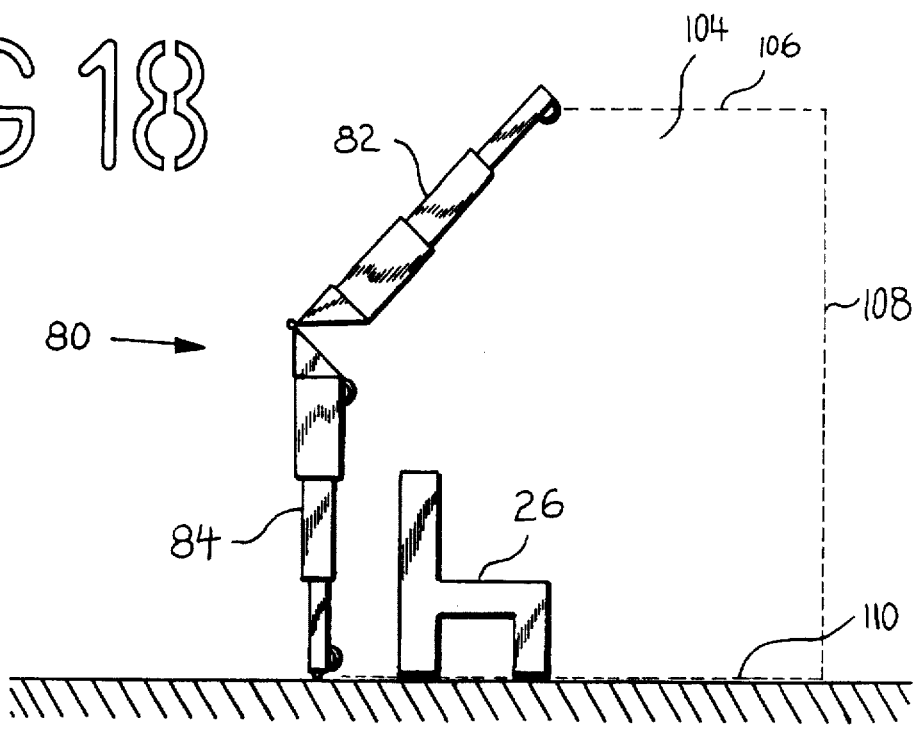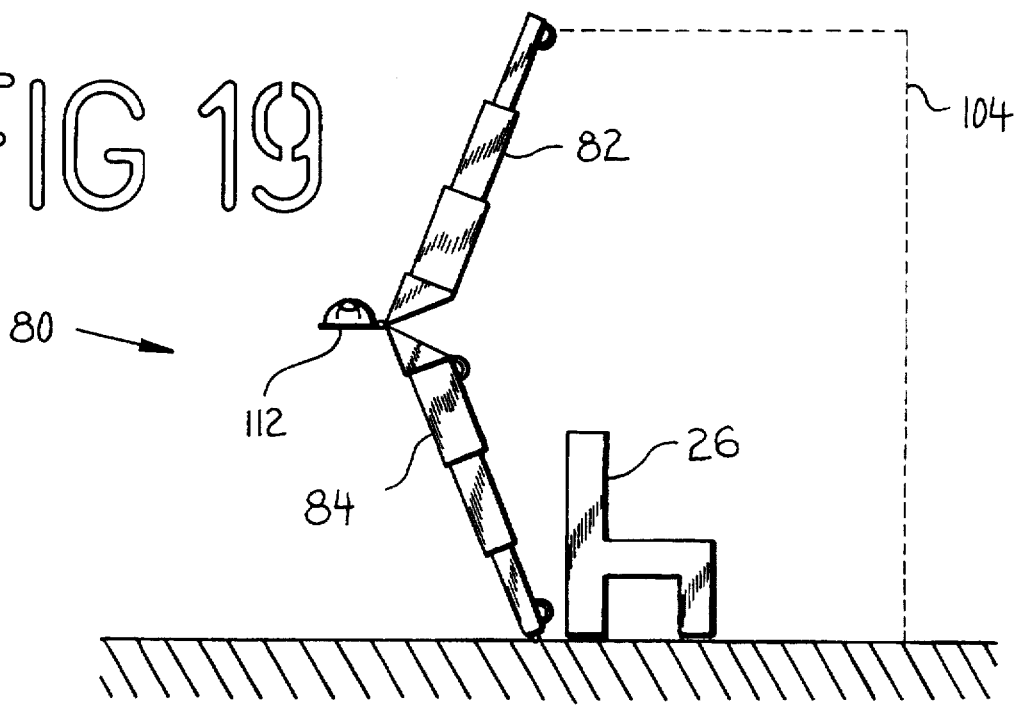

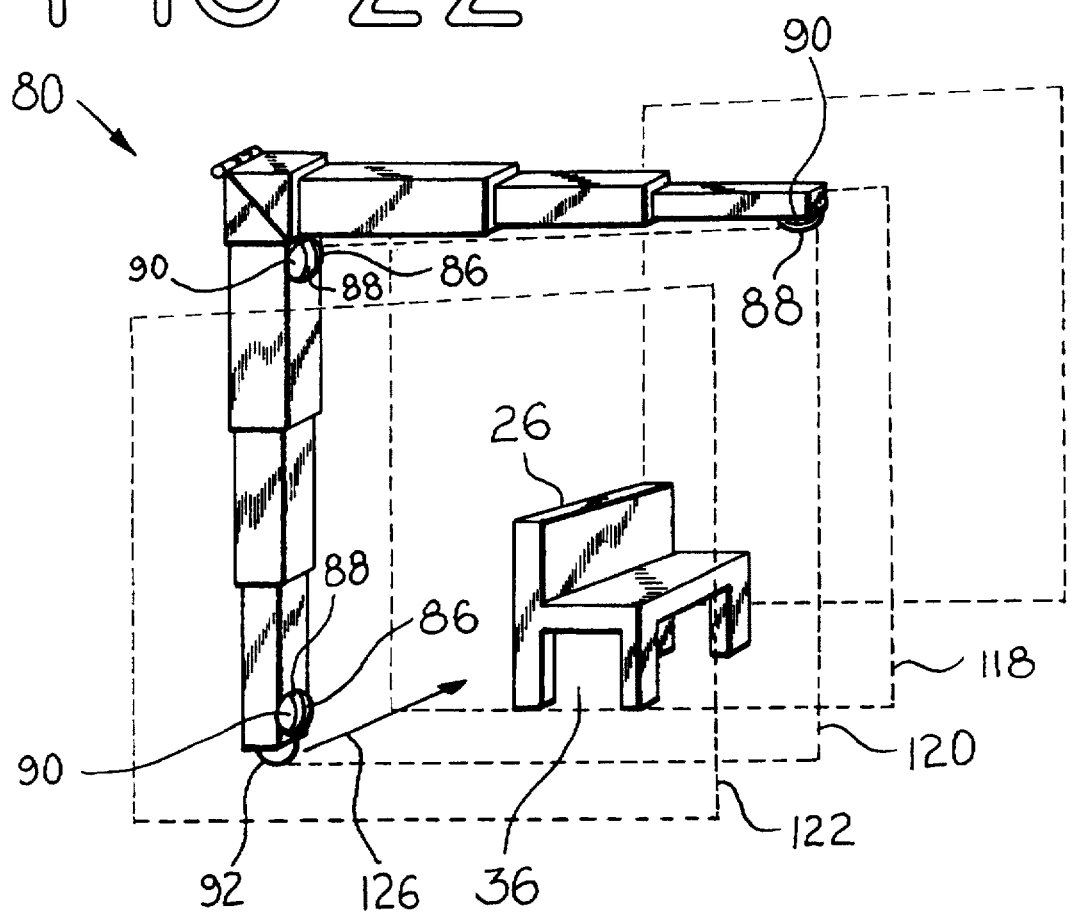
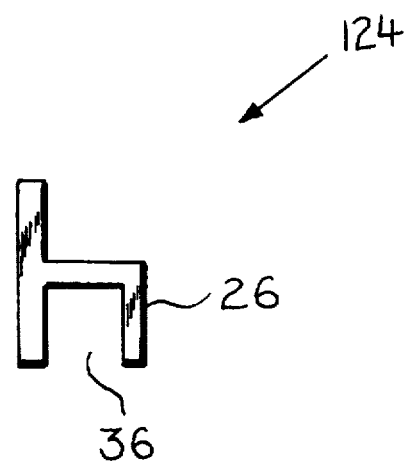

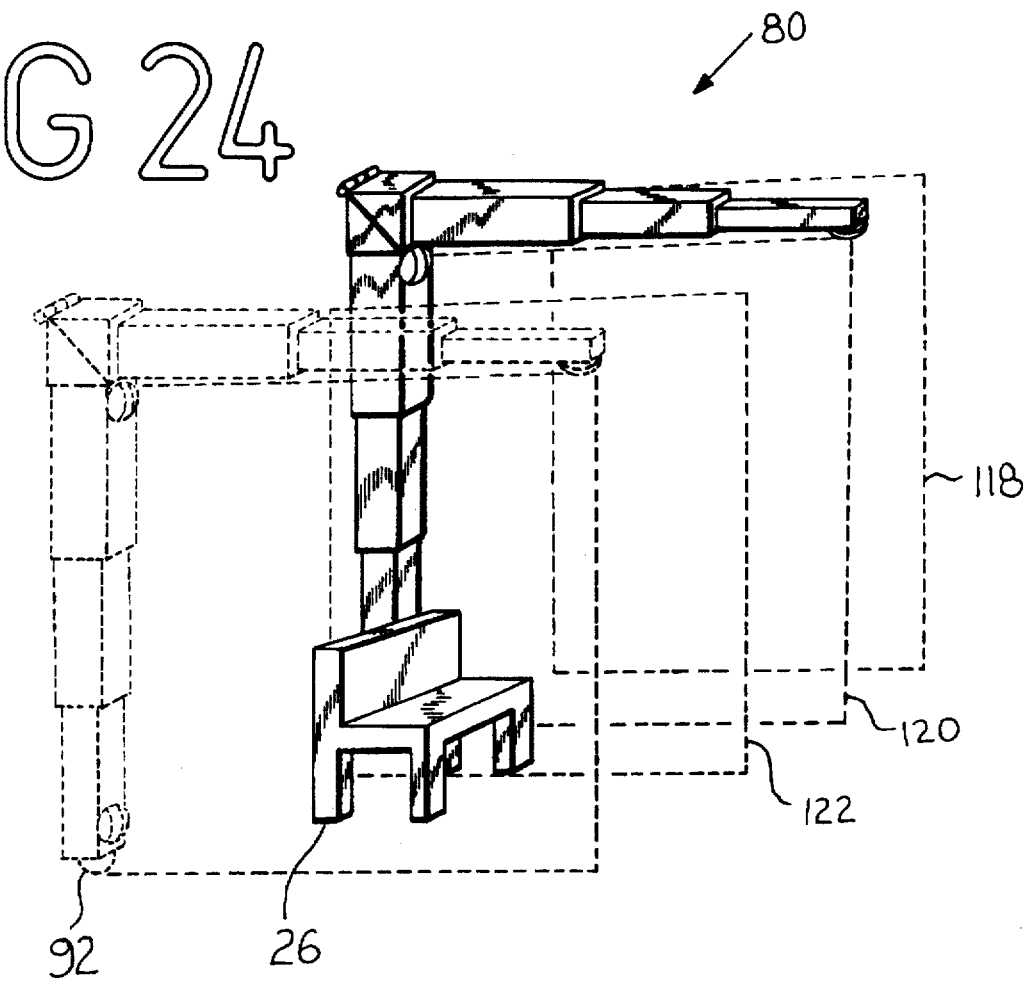
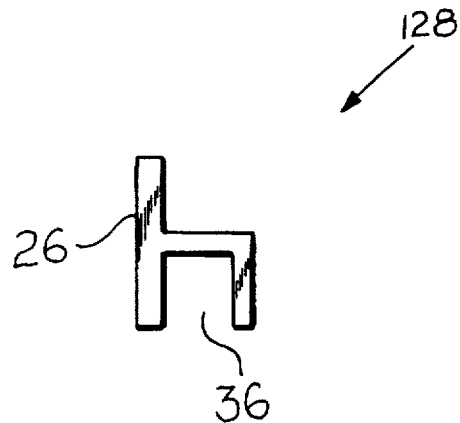

5,739,426

1

VOLUME MEASUREMENT APPARATUS AND METHOD

This is a Continuation in Part of application Ser. No. 08/582,347 filed Jan. 19, 1996, now U.S. Pat. No. 5,663,498.

FIELD OF THE INVENTION

This invention relates to measurement apparatuses and methods, and in particular to a volume measurement apparatus and method.

BACKGROUND OF THE INVENTION

The problem of volume measurement of disparately shaped goods has long defied simple solution. Since the dawn of human history, volume measurement of differently shaped objects has been important for a number of reasons: to be able to estimate the space required to store the items, to transport the items, to package the items, etc. For example, early sailing vessels incorporated only limited storage space for provisions, so effective trip logistics planning demanded accurate volume estimates of provisions—the survival of the crew and passengers could depend on it!

In more recent history, precise cubic volume measurement is crucial in ocean and air freight containerization, railroad box car and railroad container loading, efficient storage, and over-the-road shipment of lots comprising odd-shaped items such as household goods.

In addition, from the expense perspective, since the cost charged to store or to transport items is frequently linked to the cubic volume of the goods, it can be very costly to the shipper or the storage facility owner to underestimate the volume of goods. Similarly, a shipper or bailor's ability to accurately estimate cubic volume of goods to be shipped or stored facilitates more accurate cost quotes and contributes to the orderliness of these markets, to the benefit of the economy as a whole.

EXISTING DESIGNS AND METHODS

Currently, hand tools such as measuring tapes and yardsticks are used to measure the volume of disparately-shaped goods. To take one example, in the area of household goods volume measurement, the cubic volume of a refrigerator or stove may be fairly readily estimated using a measuring tape. Volume measurement of more complex shapes such as sofas, desk chairs, loveseats, dining room chairs, tables, etc., however, is not so easily accomplished. Given these irregular shapes, visual estimation becomes necessary, with attendant inaccuracy. In fact, in the average household goods move, the cubic volume estimate at the quotation stage may contain errors as high as 10–20% or more. These erroneous estimates can contribute to the under-utilization of shipping resources, which leads to wasted shipping space, increased costs, and wasted fuel. These disadvantages operate to the detriment of not only the shipping and storage industry, but to the detriment of society at large.

SUMMARY OF THE INVENTION

Accordingly, it is an object of the present invention to provide a volume measurement apparatus and method which will accurately measure the cubic volume of complex-shaped three dimensional objects. Design features allowing this object to be accomplished include nine sensors electrically connected to a volume measurement means. Advantages associated with the accomplishment of this object include increased transportation and storage efficiency, along with the associated cost and transportation fuel savings.

2

It is another object of the present invention to provide a volume measurement apparatus and method which is collapsible and foldable. Design features allowing this object to be accomplished include a telescoping volume measurement apparatus vertical leg hingedly attached to a telescoping volume measurement apparatus horizontal leg. Benefits associated with the accomplishment of this object include reduced collapsed size, along with the associated easier storage and transportation.

It is another object of this invention to provide a volume measurement apparatus and method which may be either rolled along a surface or rotated about a vertical axis in order to measure the volume of an object encompassed within its legs. Design features enabling the accomplishment of this object include a trackball disposed on the vertical leg and a mode switch electrically connected to the volume measurement means. Advantages associated with the realization of this object include increased flexibility and ease of use.

It is still another object of this invention to provide a volume measurement apparatus and method which detects voids within an object whose volume is being measured. Design features allowing this object to be achieved include a plurality of forward-looking sensors electrically connected to the volume measurement means, and a plurality of rearward-looking sensors electrically connected to the volume measurement means. A benefit associated with reaching this objective is more accurate volume measurement.

BRIEF DESCRIPTION OF THE DRAWINGS

The invention, together with the other objects, features, aspects and advantages thereof will be more clearly understood from the following in conjunction with the accompanying drawings.

Thirteen sheets of drawings are provided. Sheet one contains FIG. 1. Sheet two contains FIG. 2. Sheet three contains FIG. 3. Sheet four contains FIGS. 4–6. Sheet five contains FIGS. 7–10. Sheet six contains FIGS. 11–14. Sheet seven contains FIG. 15.

FIG. 4 is a front isometric view of a chair.

FIG. 5 is a chair side cross section view taken at section 5—5 of FIG. 4.

FIG. 6 is a chair seat cross section view taken at section 6—6 of FIG. 4.

FIG. 16 is a side isometric view of an alternate embodiment volume measurement apparatus incorporating a trackball, a hinged connection between a first leg and a second leg, forward-looking sensors, and rearward-looking sensors.

FIG. 17 is a side cross-sectional view of an alternate embodiment volume measurement apparatus.

FIG. 18 is a side view of an alternate embodiment volume measurement apparatus in position ready to measure the volume of a chair.

FIG. 19 is a side view of an alternate embodiment volume measurement apparatus in a different position ready to measure the volume of a chair.

FIG. 22 depicts an alternate embodiment volume measurement apparatus being used to measure the volume of a chair by rolling the alternate embodiment volume measurement apparatus past the chair, and also illustrates the scan windows of the forward-looking sensors and the rearward-looking sensors.

FIG. 23 depicts the return scanned by the forward-looking sensors in FIG. 22, including the shape of the chair side intra-leg void.

FIG. 24 depicts an alternate embodiment volume measurement apparatus being used to measure the volume of a chair by rolling the alternate embodiment volume measurement apparatus past the chair, and also illustrates the scan windows of the forward-looking sensors and the rearward-looking sensors.

FIG. 25 depicts the return scanned by the rearward-looking sensors in FIG. 24, including the shape of the chair side intra-leg void.

DETAILED DESCRIPTION OF THE PREFERRED EMBODIMENT

Figure 1:
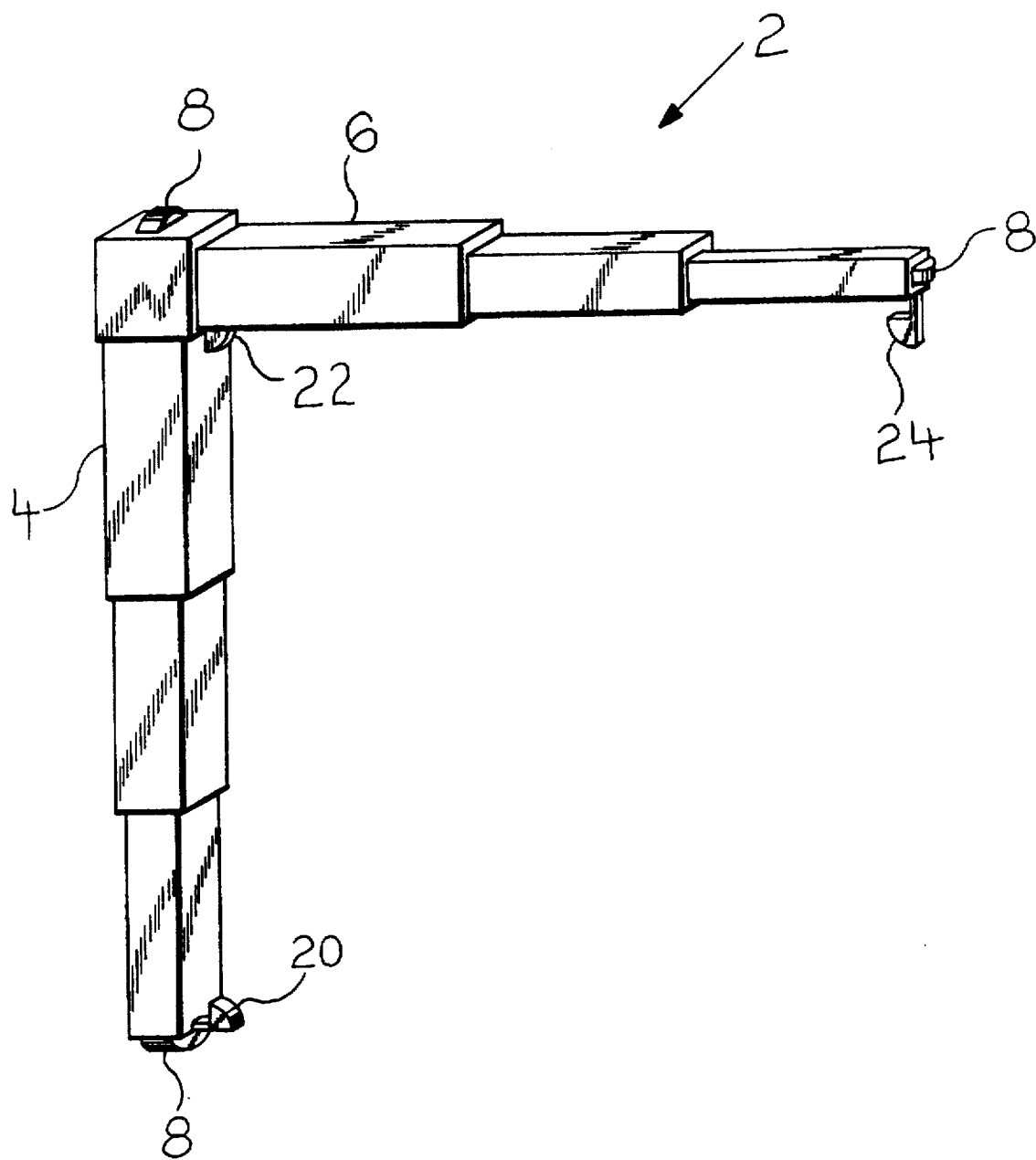
FIG. 1 is a front isometric view of a volume measurement apparatus.

FIG. 1 is a front isometric view of volume measurement apparatus 2. Volume measurement apparatus 2 comprises vertical leg 4 rigidly attached to horizontal leg 6 at an angle of approximately 90 degrees. Horizontal leg 6 and vertical leg 4 are extendible, so as to permit vertical leg 4 and horizontal leg 6 to be compactly retracted in order to transport or store volume measurement apparatus 2.

Figure 2:
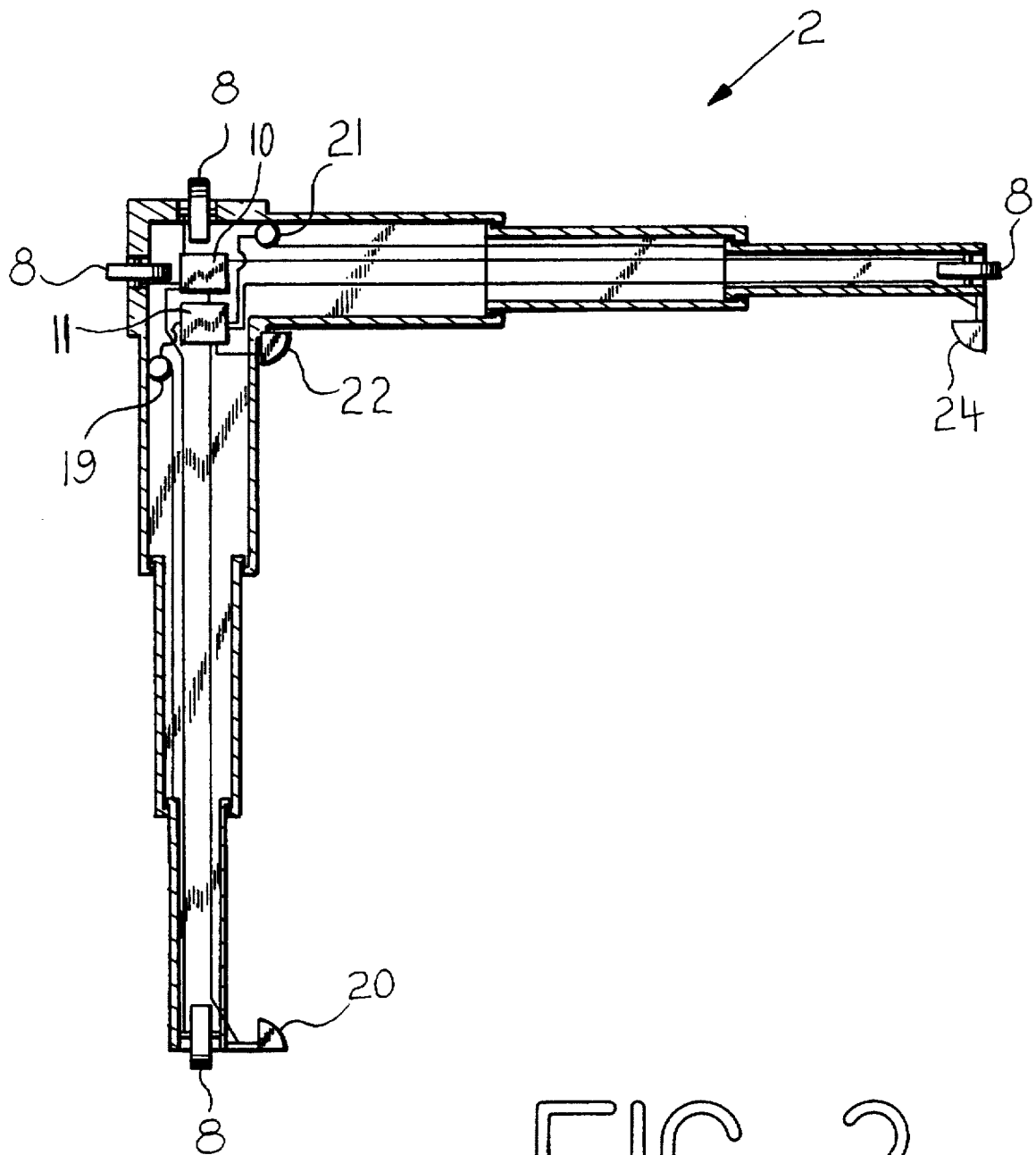
FIG. 2 is a cross sectional view of a volume measurement apparatus.

As may be observed in FIG. 2, volume measurement apparatus 2 further comprises vertical leg extension measurement means 19, which measures the extended length of vertical leg 4, and horizontal leg extension measurement means 21, which measures the extended length of horizontal leg 21. Vertical leg extension measurement means 19 and horizontal leg extension measurement means 21 are electrically connected to volume measurement means 11. The leg extension values measured by vertical leg extension measurement means 19 and horizontal leg extension measurement means 21 are transmitted to volume measurement means 11 for use in the volume measurement function.

Measuring wheels 8 are rotatably attached to volume measurement apparatus 2 at a plurality of locations. First sensor 20 is attached to an extreme of vertical leg 4 opposite horizontal leg 6. Second sensor 22 is attached to volume measurement apparatus 2 at the junction of vertical leg 4 and horizontal leg 6. Third sensor 24 is attached to an extreme of horizontal leg 6 opposite vertical leg 4.

FIG. 2 is a cross sectional view of volume measurement apparatus 2. Sensors 20, 22 and 24 are electrically connected to volume measuring means 11. Measuring wheels 8 are electrically connected to measuring wheel travel detection means 10. Sensors 20, 22, and 24, vertical leg extension measurement means 19, horizontal leg extension measurement means 21, and measuring wheel travel detection means 10, are electrically connected to volume measurement means 11.

Figure 3:
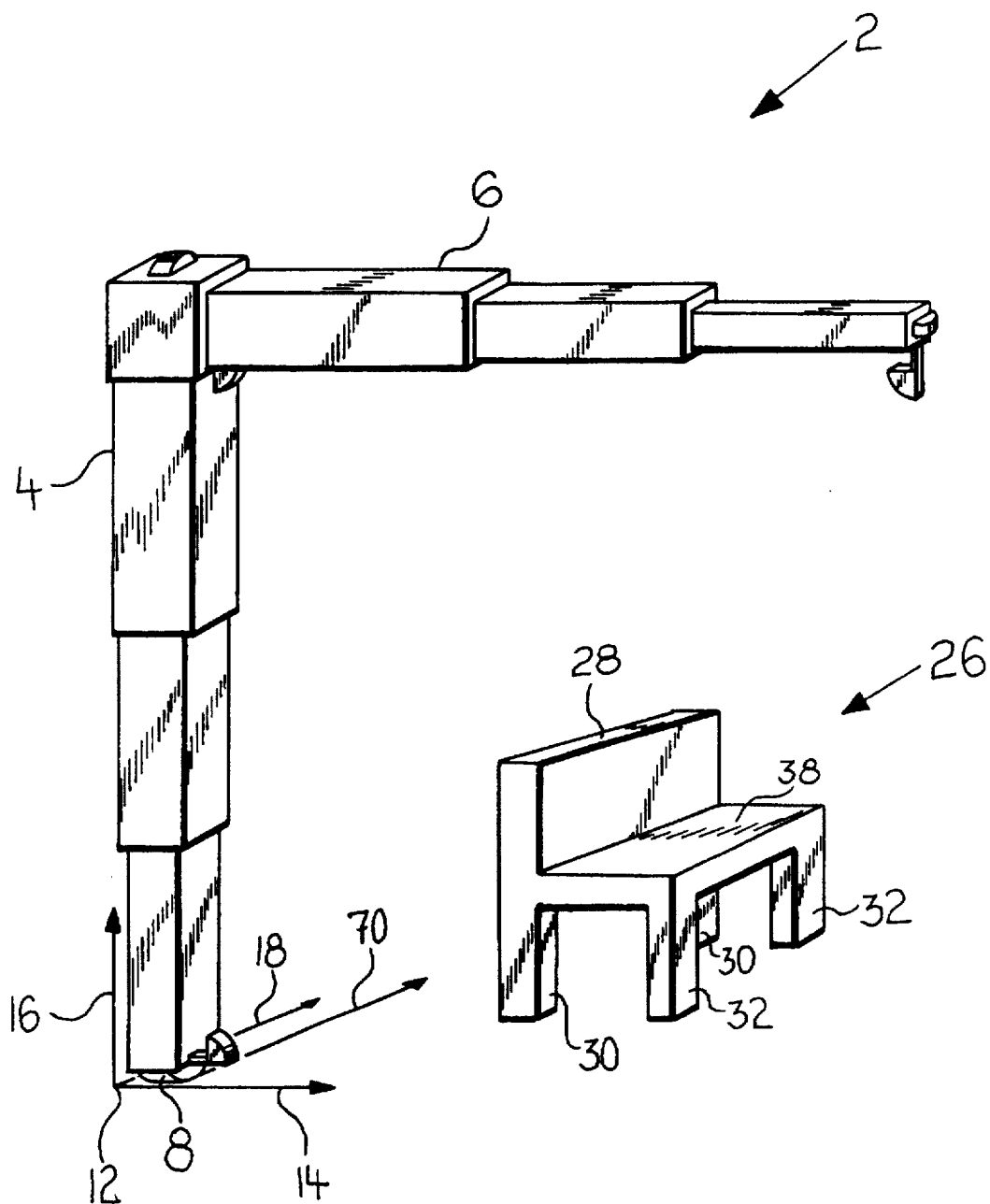
FIG. 3 is a front isometric view of a volume measurement apparatus in position ready to measure the volume of a chair.

FIG. 3 is a front isometric view of volume measurement apparatus 2 in position ready to measure the volume of chair 26. Chair 26 comprises chair back 28 attached to chair seat 38. Chair rear legs 30 and chair front legs 32 are also attached to chair seat 38.

It will be useful to make reference to a three-dimensional Cartesian coordinate system in the following description of how volume measurement apparatus 2 works. Accordingly, origin 12 is disposed at a point where a measuring wheel 8, rotatably attached to an extreme of vertical leg 4 opposite horizontal leg 6, contacts a horizontal flat surface when volume measurement apparatus 2 is in position ready to measure the volume of chair 26. Chair 26 also rests upon the flat surface. X axis 14 and Z axis 18 are mutually perpendicular and are disposed in the flat surface upon which measuring wheel 8 and chair 26 rest. Y axis 16 is perpendicular to X axis 14 and Z axis 18, and is normal to the flat surface upon which chair 26 rests. X axis 14, Y axis 16 and Z axis 18 intersect at origin 12. When the volume of chair 26 is to be measured, a measuring wheel 8 is rolled along Z axis 18 as indicated by arrow 70, while maintaining volume measurement apparatus vertical leg 4 parallel to Y axis 16 and volume measurement apparatus horizontal leg 6 parallel to X axis 14.

FIG. 4 is a front isometric view of chair 26. Chair rear intra-leg void 40 is disposed under chair seat 38, between chair rear legs 30. Chair front intra-leg void 42 is disposed under chair seat 38, between chair front legs 32. Chair side intra-leg voids 36 are disposed under chair seat 38, between each chair rear leg 30/chair front leg 32 pair. Chair central void 34 is centrally disposed under chair seat 38.

FIG. 5 is a side cross sectional view of chair 26 taken at section 5—5 of FIG. 4, which is chair side cross section 27. Chair side cross section 27 comprises cross sections of a front leg 32 and a chair rear leg 30 taken from the same side of chair 26, as well as a cross section of chair back 28 and chair seat 38. Chair side intra-leg void 36 is disposed under chair seat 38, between rear leg 30 and front leg 32.

FIG. 6 is a cross section view of chair 26 taken at section 6—6 of FIG. 4, which comprises chair seat cross section 29. Chair seat cross section 29 comprises a cross section of chair back 28 and a cross section of chair seat 38. Chair central void 34 is disposed under chair seat 38. Chair rear intra-leg void 40 is disposed under chair seat 38, between chair rear legs 30, and chair front intra-leg void 42 is disposed under chair seat 38, between chair front legs 32.

As is depicted in FIGS. 5–15, volume measurement apparatus 2 functions by scanning an object (such as chair 26) at regular intervals along Z axis 18 while volume measurement apparatus 2 is rolled along Z axis 18 on a measuring wheel 8, as indicated by arrow 70 (see FIG. 3). For example in the preferred embodiment, first sensor 20, second sensor 22 and third sensor 24 are set to emit a scan and detect a return at one inch increments along Z axis 18. This is accomplished by virtue of the electric connection between measuring wheels 8 and measuring wheel travel detection means 10, between wheel travel detection means 10 and volume measurement means 11, and between first sensor 20, second sensor 22, and third sensor 24 and volume measurement means 11 (see FIG. 2). Once volume measuring means 11 has been activated, the rotation of a measuring wheel 8 signals measuring wheel travel detection means 10 each time volume measurement apparatus 2 reaches a one-inch increment along Z axis 18. At each pre-set Z axis 18 increment (one inch Z axis 18 intervals in the preferred embodiment), measuring wheel travel detection means 10 instructs first sensor 20, second sensor 22, and third sensor 24 to scan the object whose volume is being measured (chair 26 in this example).

FIG. 3 depicts volume measurement apparatus 2 in position, ready to measure the volume of chair 26. As volume measurement apparatus 2 is moved in the direction indicated by arrow 70, first sensor 20, second sensor 22 and third sensor 24 simultaneously scan chair 26 at predetermined increments along Z axis 18. As may be observed in FIG. 3, volume measurement apparatus 2 will initially scan the nearest chair side cross section 27, depicted in FIG. 5. For the purposes of the present example, if the nearest chair side cross section 27 is 4 inches wide (as measured along Z axis 18), volume measurement apparatus 2 will detect and sum four chair side volume area increments 61 totaling one chair side volume 60 (see FIG. 15).

As volume measurement apparatus 2 continues travel along Z axis 18 (as indicated by arrow 70) past the nearest chair side cross section 27, the next part of chair 26 scanned will be chair seat cross section 29, depicted in FIG. 6. For the purposes of the present example, if chair seat cross section 29 is ten inches wide (as measured along Z axis 18), volume measurement apparatus 2 will detect and sum the volumes of ten seat volume area increments 63 totaling chair seat volume 62 (see FIG. 15).

As volume measurement apparatus 2 continues travel along Z axis 18 (as indicated by arrow 70) past chair seat cross section 29, the final part of chair 26 scanned will be farthest chair side cross section 27, as is depicted in FIG. 5. For the purposes of the present example, if the farthest chair side cross section 27 is four inches wide (as measured along Z axis 18), volume measurement apparatus 2 will detect four chair side volume increments 61 which sum to yield a chair side volume 60 four inches wide (see FIG. 15).

At each scan increment along Z axis 18 during a given volume measurement run, volume measuring means 11 counts how many units of area (e.g. square inches) are contained in a cross section scanned. After each such count, volume measurement apparatus 2 multiplies the cross section area scanned by the Z-axis scan increment to yield a volume increment, and then sums this volume increment to those calculated thus far during the volume measurement run, which yields the volume scanned through the latest count. At the end of a given volume measurement run, volume measurement apparatus 2 has taken the last run scan, and volume measuring means 11 has summed all of the run volume increments, in order to yield the total volume of the object whose volume was being measured.

The method which volume measurement apparatus 2 employs to measure the incremental cross sectional areas of the object to be measured (chair side volume area increments 61 and chair seat volume area increments 63 in the present example) is described in the following paragraphs, and illustrated in FIGS. 7–14.

Figure 7:
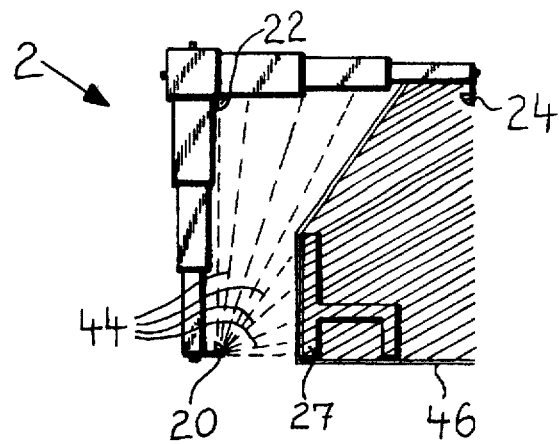
FIG. 7 is a side view of a first sensor scanning a chair side cross section.

FIGS. 7–10 illustrate the method which volume measurement apparatus 2 employs to measure chair side volume area increments 61. FIGS. 7–10 depict first sensor 20, second sensor 22, and third sensor 24 scanning chair side cross section 27. FIG. 7 is a side view of first sensor 20 scanning chair side cross section 27. First sensor 20 emits first sensor scan 44, which impinges on chair side cross section 27, yielding a first sensor return 46 (delimited by a double line containing 30° ascending hatching), which is detected by first sensor 20. The disposition of first sensor return 46 is communicated to volume measuring means 11.

Figure 8:
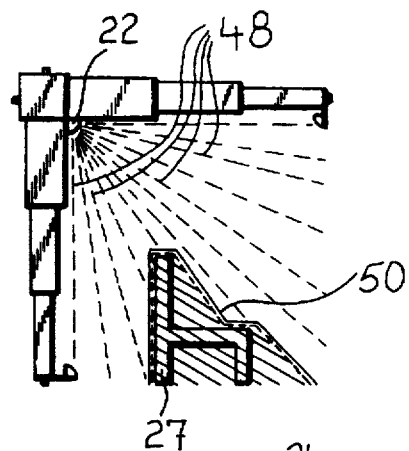
FIG. 8 is a side view of a second sensor scanning a chair side cross section.

FIG. 8 is a side view of second sensor 22 simultaneously scanning chair side cross section 27. Second sensor 22 emits second sensor scan 48, which impinges on chair side cross section 27, yielding second sensor return 50 (delimited by a solid line outside a dashed line containing 30° descending hatching), which is detected by second sensor 22. The disposition of second sensor return 50 is communicated to volume measuring means 11.

Figure 9:
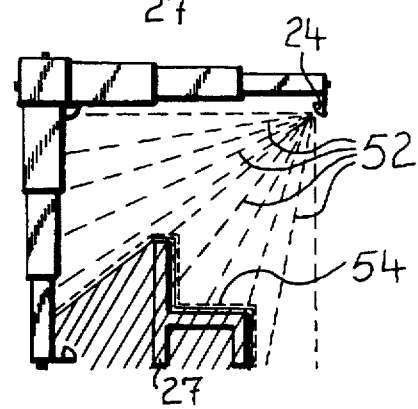
FIG. 9 is a side view of a third sensor scanning a chair side cross section.

FIG. 9 is a side view of third sensor 24 simultaneously scanning chair side cross section 27. Third sensor 24 emits third sensor scan 52, which impinges on chair side cross section 27, yielding a third sensor return 54 (delimited by a dashed line outside a solid line containing 60° ascending hatching), which is detected by third sensor 24. The disposition of third sensor return 54 is communicated to volume measuring means 11.

Figure 10:
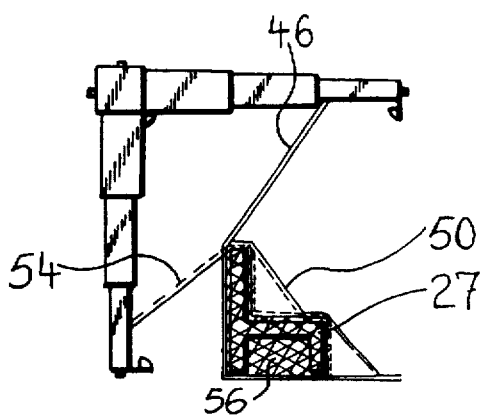
FIG. 10 is a side view of the summation of the scans of a first sensor, a second sensor, and a third sensor, of a chair side cross section.

FIG. 10 is a side view of sensors 20, 22, and 24 simultaneously scanning chair side cross section 27 (as described in the preceding three paragraphs) and generating sensor returns 46, 50 and 54, which combine to yield chair side cross section return 56 (identified by triple hatching).

Volume measuring means 11 counts only the area that all three sensors 20, 22 and 24 report as solid, which is chair side cross section return 56 (identified by triple hatching).

Volume measuring means 11 adds the product of the area of chair side cross section return 56 multiplied by the Z axis increment (1 inch in the present example), to the previously measured and summed chair side volume increments 61. Thus when volume measurement apparatus 2 has rolled past chair side volume 60, volume measuring means 11 has summed four chair side volume increments 61 to arrive at chair side volume 60 (see FIG. 15). In the present example note that although chair side intra-leg voids 36 are interpreted by volume measurement apparatus 2 as solid material and therefore summed into chair volume 64, chair rear intra-leg void 40, chair front intra-leg void 42 and chair central void 34 are correctly perceived by volume measurement apparatus 2 as voids, and not included in chair volume 64. Therefore, even though chair side intra-leg voids 36 are not actually a solid part of chair 26, they are included in chair side volumes 60 as small but acceptable volume measurement errors.

FIGS. 11–14 illustrate the method which volume measurement apparatus 2 employs to measure chair seat volume area increments 63. FIGS. 11–14 depict first sensor 20, second sensor 22, and third sensor 24 scanning chair seat cross section 29.

Figure 11:
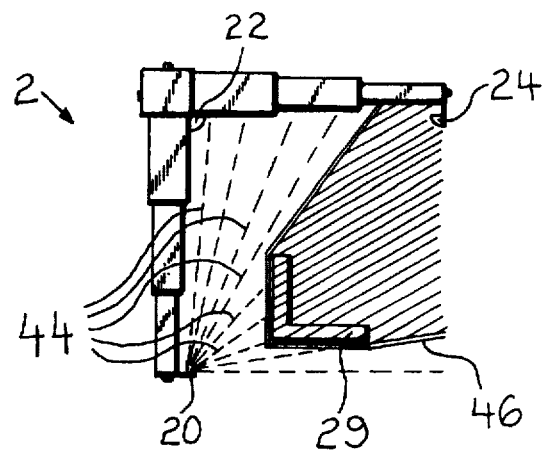
FIG. 11 is a side view of a first sensor scanning a chair seat cross section.

FIG. 11 is a side view of first sensor 20 scanning chair seat cross section 29. First sensor 20 emits first sensor scan 44, which impinges on chair seat cross section 29, yielding a first sensor return 46 (delimited by a double solid line containing 30° ascending hatching), which is detected by first sensor 20. The disposition of first sensor return 46 is communicated to volume measuring means 11.

Figure 12:
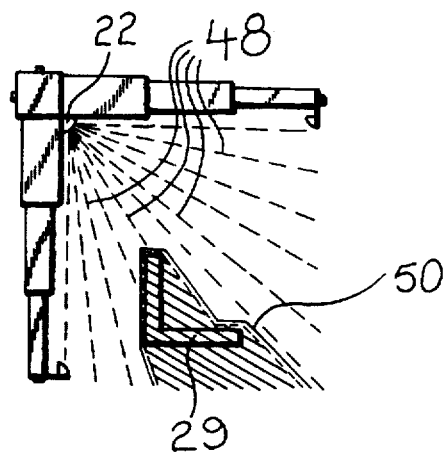
FIG. 12 is a side view of a second sensor scanning a chair seat cross section.

FIG. 12 is a side view of second sensor 22 simultaneously scanning chair seat cross section 29. Second sensor 22 emits second sensor scan 48, which impinges on chair seat cross section 29, yielding second sensor return 50 (delimited by a solid line outside a dashed line containing 30° descending hatching), which return is detected by second sensor 22. The disposition of second sensor return 50 is communicated to volume measuring means 11.

Figure 13:
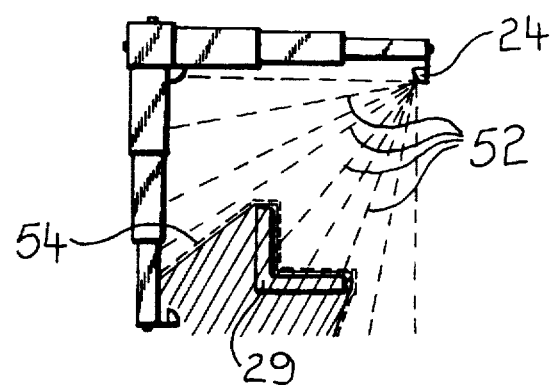
FIG. 13 is a side view of a third sensor scanning a chair seat cross section.

FIG. 13 is a side view of third sensor 24 simultaneously scanning chair seat cross section 29. Third sensor 24 emits third sensor scan 52, which impinges on chair seat cross section 29, yielding a third sensor return 54 (delimited by a dashed line outside a solid line containing 60° ascending hatching), which is detected by third sensor 24. The disposition of third sensor return 54 is communicated to volume measuring means 11.

Figure 14:
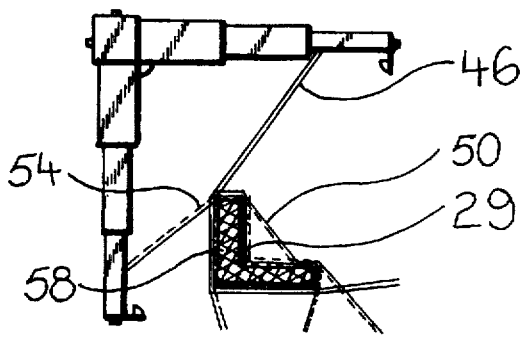
FIG. 14 is a side view of the summation of the scans of a first sensor, a second sensor, and a third sensor, of a chair seat cross section.

FIG. 14 is a side view of sensors 20, 22, and 24 simultaneously scanning chair seat cross section 29 and generating sensor returns 46, 50 and 54, which combine to yield chair seat cross section return 58 (identified by triple hatching). Volume measuring means 11 figures only the area that all three sensors 20, 22 and 24 report as solid, which is chair seat cross section return 58 (identified by triple hatching).

Volume measuring means 11 adds the product of the area of chair seat cross section return 58 multiplied by the Z axis increment (1 inch in the present example), to the previously calculated and summed chair seat volume increments. Thus when volume measurement apparatus 2 has rolled past chair seat volume 62 (as depicted in FIG. 15), volume measuring means 11 has summed ten chair seat volume increments 63 to arrive at the chair seat volume 62.

Figure 15:
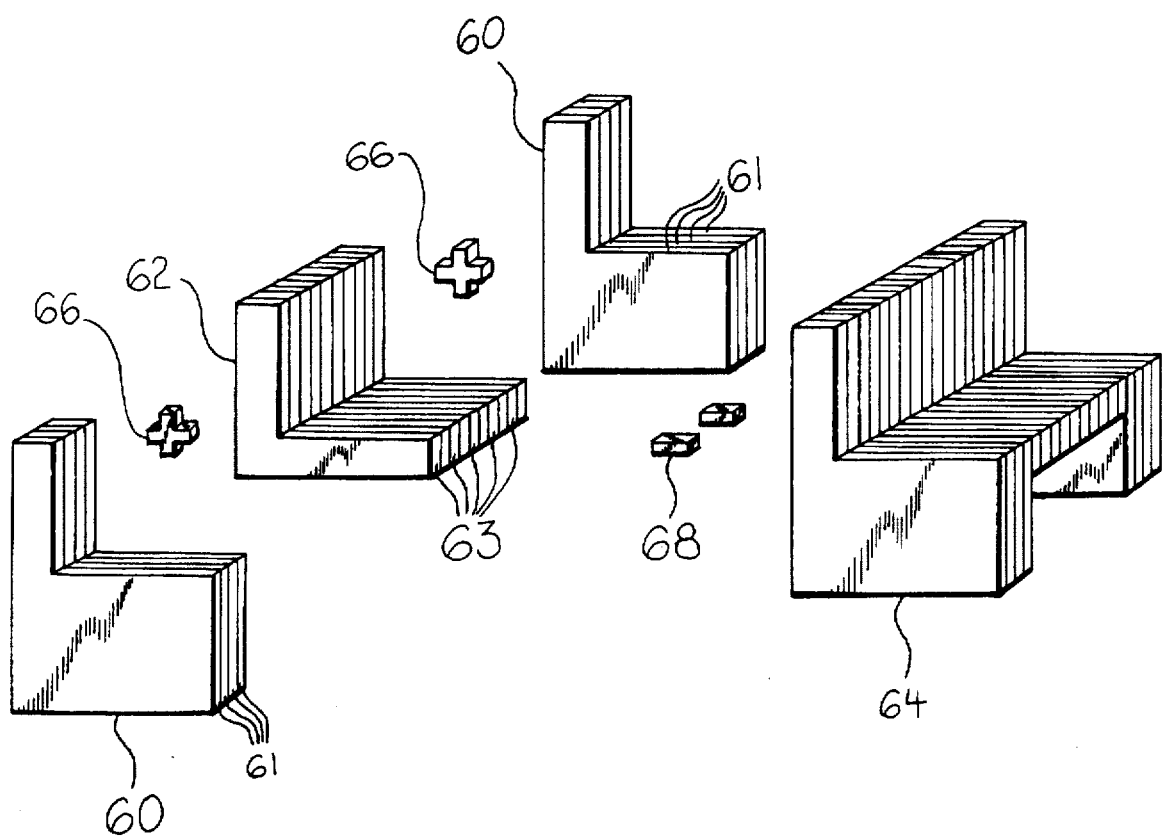
FIG. 15 is a side isometric view of two chair side volumes added to one chair seat volume to yield the chair volume.

FIG. 15 is a side isometric view of two chair side volumes 60 added to one chair seat volume 62 (as illustrated by addition signs 66), to yield chair volume 64 (as is illustrated by equal sign 68). In the present example, each chair side volume 60 comprises four chair side volume area increments 61, and chair seat volume 62 comprises ten chair seat volume area increments 63.

In the instant example, a measuring wheel 8 disposed at an extreme of vertical leg 4 opposite horizontal leg 8 was rolled across a flat surface upon which chair 26 rested. The rotation of this measuring wheel 8 was transmitted to measuring wheel travel detection means 10, which in turn instructed sensors 20, 22 and 24 when to operate—in this case, once every inch of measuring wheel 8 travel. Note, however, that a different measuring wheel 8 may be employed for the same purpose, depending on the location of a convenient flat rolling surface relative to an object whose volume is to be measured. For example, the measuring wheels 8 disposed at either extreme of horizontal leg 6 may be rolled along a convenient vertical flat surface such as a wall, and a measuring wheel 8 disposed at an extreme of vertical leg 4 opposite first sensor 20 may be rolled along a convenient flat surface such as a ceiling or the underside of a flat shelf.

Method of Use

A. Place volume measurement apparatus 2 at its starting position. Three-dimensional Cartesian coordinate system origin 12 is now located at a point where a measuring wheel 8 contacts a convenient flat rolling surface, and the measuring wheel 8 is oriented to roll parallel to Z axis 16. Volume measurement apparatus vertical leg 4 is aligned with Y axis 18, and volume measurement apparatus horizontal leg 6 is parallel with X axis 14.

B. Reset volume measurement apparatus 2 to indicate zero volume measured.

C. Initiate the volume measurement function of volume measurement apparatus 2.

D. Roll volume measurement apparatus 2 parallel to Z axis 16 as indicated by arrow 70 in FIG. 3. Sensors 20, 22, and 24 will scan cross sectional areas of an object embraced within volume measurement apparatus vertical leg 4 and volume measurement apparatus horizontal leg 6 at one-inch intervals along Z axis 16.

E. Volume measuring means 11 figures only the area that all three sensors 20, 22 and 24 report as solid, which is the object cross section return. Volume measuring means 11 adds the product of the object cross section return multiplied by the Z axis increment (1 inch in the present example), to the previously calculated and summed object volume increments.

F. When volume measurement apparatus 2 has rolled along Z axis 18 completely past an object being measured, a volume measurement apparatus 2 operator ceases the volume measurement function, and the volume measured is the sum of products of the incremental areas measured multiplied by the Z axis measurement increment (one inch in the present example). In the present example, the volume of the object being measured thus calculated is expressed in cubic inches.

FIGS. 16–25 depict alternate embodiment volume measurement apparatus 80, which incorporates forward looking sensors 86, sideward-looking sensors 88, rearward looking sensors 90, trackball 92 electrically connected to trackball movement detection means 100, hinge 94, first leg inclinometer 96 and second leg inclinometer 98.

As may be observed in FIGS. 16 and 17, alternate embodiment volume measurement apparatus 80 comprises first leg 82 hingedly attached to second leg 84 by means of hinge 94. Hinge 94 permits the angle between first leg 82 and second leg 84 to be varied in order to provide more flexibility when using alternate embodiment volume measurement apparatus 80 to measure the volume of an object as is illustrated in FIGS. 18 and 19. In addition, hinge 94 permits alternate embodiment volume measurement apparatus 80 to be folded for transportation or storage by rotating first leg 82 about hinge 94 as indicated by arrow 85 until first leg 82 rests against second leg 84. First leg 82 and second leg 84 may also be collapsed telescopically as previously described in order to place alternate embodiment volume measurement apparatus 80 in a small, convenient package for storage and transportation.

A forward-looking sensor 86, sideward-looking sensor 88 and rearward-looking sensor 90 are disposed at an extreme of first leg 82 opposite hinge 94. A forward-looking sensor 86, sideward-looking sensor 88 and rearward-looking sensor 90 are disposed at an extreme of second leg 84 opposite hinge 94. A forward-looking sensor 86, sideward-looking sensor 88 and rearward-looking sensor 90 are disposed at the intersection of first leg 82 and second leg 84. All sensors are electrically connected to volume measurement means 11.

First leg inclinometer 96 is disposed on first leg 82 and is electrically connected to volume measurement means 11, and communicates the incline of first leg 82 relative to the horizontal to volume measurement means 11. Second leg inclinometer 98 is disposed on second leg 84 and is electrically connected to volume measurement means 11, and communicates the incline of second leg 86 relative to the horizon to volume measurement means 11.

Figure 20:
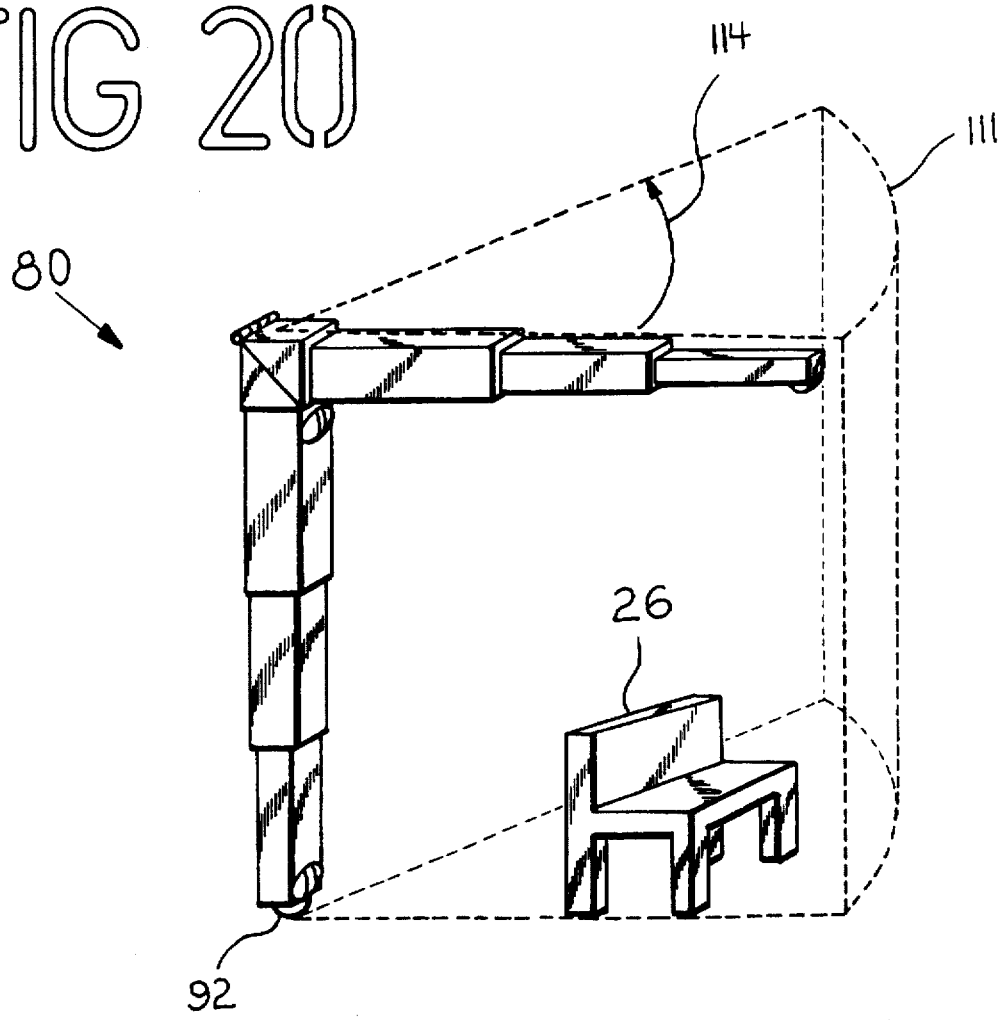
FIG. 20 depicts an alternate embodiment volume measurement apparatus being used to measure the volume of a chair by swiveling the alternate embodiment volume measurement apparatus about a vertical axis.

Trackball 92 is rotatably mounted to an extreme of second leg 84 opposite hinge 94, and is electrically connected to trackball movement detection means 100. Trackball movement detection means 100 is electrically connected to volume measurement means 11. Mode switch 102 is electrically connected to volume measurement means 11, and instructs volume measurement means 11 whether to sense trackball 92 rolling (as is illustrated in FIGS. 22 and 24), or swiveling (as is illustrated in FIG. 20).

Hinge 94 permits the angle between first leg 82 and second leg 84 to be varied for volume measurement as is illustrated in FIGS. 18 and 19. This capability increases the flexibility of use of alternate embodiment volume measurement apparatus 80. It is contemplated that depending on the physical location of hinge 94, the angle between first leg 82 and second leg 84 may be varied from 0-180+degrees.

First leg inclinometer 96 informs volume measurement means 11 the angle of first leg 82 relative to the horizontal, and consequently what angle the forward-looking sensor 86, the sideward-looking sensor 88 and the rearward-looking sensor 90 mounted on first leg 82 are at relative to the horizontal. Second leg inclinometer 98 informs volume measurement means 11 the angle of second leg 84 relative to the horizontal, and consequently what angle the sensors 86, 88 and 90 mounted on second leg 84 are at relative to the horizontal.

Because sensors 86, 88 and 90 are mapping type sensors, volume measurement means 11 may be instructed to ignore returns outside of scan window 104. Scan window 104 comprises scan window upper edge 106, scan window far edge 108, and scan window lower edge 110. In the preferred embodiment, scan window upper edge 106 was defined as a horizontal plane extending from the sensors 86, 88 and 90 mounted on first leg 82. Scan window far edge 108 was defined as a vertical plane perpendicular to scan window upper edge 106. The distance from alternate embodiment volume measurement apparatus 80 to scan window far edge 108 was set at a convenient distance great enough to measure the relevant object(s), and small enough so as not to measure the volume of undesired objects (such as walls, etc.). Scan window lower edge 110 was defined as a plane co-extensive with the floor upon which alternate embodiment volume measurement apparatus 80 rests while measuring volume. In this manner, alternate embodiment volume measurement apparatus 80 measures the relevant object (s), yet does not measure unwanted returns such as the floor, an opposite wall, etc.

As illustrated in FIG. 18, volume measurement means 11 determines the location of scan window upper edge 106, scan window far edge 108, and scan window lower edge 110 from the information supplied by horizontal leg extension measurement means 21, vertical leg extension measurement means 19, first leg inclinometer 96, and second leg inclinometer 98.

An alternate means to enable volume measurement means 11 to determine the location of scan window 104 is illustrated in FIG. 19. As shown in FIG. 19, alternate embodiment volume measurement apparatus 80 may further comprise level 112. First leg 82 and second leg 84 may be mechanically interlocked so that the angle between first leg 82 and level 112 always equals the angle between second leg 84 and level 112. This type of interlock may be achieved in a number of ways which are old in the art. One example would be a rack and gear interlock where level 112 is rigidly attached to a rack, and first leg 82 and second leg 84 are both engaged with the rack by means of gears. In combination, level 112, at least one inclinometer, and a leg interlock provide enough information to volume measurement means 11 to define scan window 104.

Figure 21:
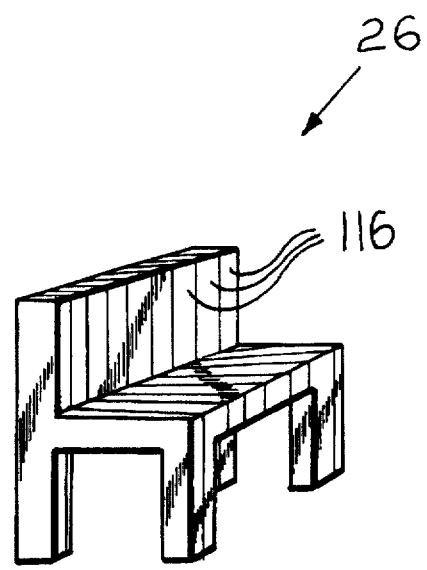
FIG. 21 illustrates the sections of a chair which have been scanned by the process illustrated in FIG. 20.

FIGS. 20 and 21 illustrate alternate embodiment volume measurement apparatus 80 measuring the volume of chair 26 by swiveling on trackball 92. Mode switch 102 is first positioned so as to instruct volume measurement means 11 to operate in swivel mode. In swivel mode, trackball movement detection means 100 instructs all sensors to scan at set intervals. In the preferred embodiment, trackball movement detection means 100 instructed all sensors to scan once per degree of swivel. In order to measure the volume of chair 26, alternate embodiment volume measurement apparatus 80 is swiveled as indicated by arrow 114, and sensors 86, 88 and 90 scan swivel scan volume 111 once per degree of swivel. Chair volume increments 116 are readily calculated by volume measurement means 11 using well known principles of solid geometry. At the conclusion of the scanning process, volume measurement means 11 sums the chair volume increments 116 to determine the volume of chair 26, as illustrated in FIG. 21.

FIGS. 22 through 25 illustrate how forward-looking sensors 86 and rearward-looking sensors 90 eliminate the chair side intra-leg void 36 error which the previously described volume measurement apparatus 2 embodiment gave rise to. FIG. 22 shows alternate embodiment volume measurement apparatus 80 ready to start scanning chair 26 by rolling past chair 26 as indicated by arrow 126. FIG. 24 shows alternate embodiment volume measurement apparatus 80 after having rolled past chair 26, at the conclusion of the volume measurement roll. The original position of alternate embodiment volume measurement apparatus 80 (where it was located in FIG. 22) is shown in ghost lines in FIG. 24.

FIG. 22 shows forward-looking sensors 86 scanning forward, in the direction of alternate embodiment volume measurement apparatus 80 travel, within forward window 118. In the preferred embodiment, forward window 118 was defined as parallel to, and one foot forward of, sideward window 120. Forward return 124 scanned by forward-looking sensors 86 is illustrated in FIG. 23. Sideward-looking scanners 88 scan sideward window 120, and measure the volume of chair 26 as previously described in connection with FIGS. 3-15. Rearward-looking scanners 90 scan backwards, opposite the direction of travel, within rearward window 122. In the preferred embodiment, rearward window 122 was parallel to, and one foot behind, sideward window 120. Rearward return 128 scanned by rearward-looking scanners 90, after alternate embodiment volume measurement apparatus 80 has rolled past chair 26 into its position in FIG. 24, is illustrated in FIG. 25.

Each time trackball 92 rolls a given increment (1 inch in the preferred embodiment), trackball movement detection means 100 instructs all sensors to scan. Voids detected by forward-looking scanners 86 and rearward-looking scanners 90 are subtracted from the total volume measured by sideward-looking scanners 88, to arrive at a more accurate object volume. In this particular example, intra-leg voids 36 are identified by forward-looking scanners 86 and rearward-looking scanners 90. The volume of intra-leg void 36 is then subtracted from the chair 26 volume measured by sideward-looking sensors 88, in order to yield a substantially more accurate volume measurement.

Rearward-looking scanners 86 and forward-looking scanners 90 also serve to increase the accuracy of volume measurements procured by alternate embodiment volume measurement apparatus 80 in the swivel mode. As in the roll mode, each time trackball 92 swivels a given increment (1 degree in the preferred embodiment), trackball movement detection means 100 instructs all sensors to scan. Voids detected by forward-looking scanners 86 and rearward-looking scanners 90 are subtracted from the total volume measured by sideward-looking scanners 88, to arrive at a more accurate object volume. In this particular example, intra-leg voids 36 are identified by forward-looking scanners 86 and rearward-looking scanners 90. The volume of intra-leg void 36 is then subtracted from the chair 26 volume measured by sideward-looking sensors 88, in order to yield a substantially more accurate volume measurement.

In the preferred embodiments, sensors 20, 22, 24, 86, 88 and 90 were miniature radars utilizing technology such as is taught in McEwan U.S. Pat. No. 5,274,271, which patent is hereby incorporated in its entirety by reference. Additional technologies which may be employed in the instant invention include those taught in Walsh U.S. Pat. No. 3,681,747, Wawhinney et al. U.S. Pat. No. 5,043,735, Kivits U.S. Pat. No. 5,202,740 and Link et al. U.S. Pat. No. 5,572,427, which patents are hereby incorporated in their entirety by reference. The inventor wishes to make clear, however, that the scope of this invention is intended to include any sensor means, including but not limited to radars, sonars, X-rays, infra-red, etc.

Measuring wheel travel detection means 10 and measuring wheels 8 comprised standard rotary distance measuring apparatus, such as is routinely used by mechanical draftsmen to measure drawing line lengths (or on larger scale, by vehicles to measure distance traveled). Volume measuring means 11 was an integrated circuit calibrated to superimpose sensor returns 46, 50 and 54 in order to figure object cross sectional areas, and to sum the products of progressive object cross sectional areas multiplied by a Z-axis increment. In the alternate embodiment volume measurement apparatus 80, volume measurement means 11 was further programmed to apply simple geometrical formulas to calculate chair volume increments 116 and the volumes of any voids scanned by rearward-looking scanners 86 and forward-looking scanners 90. The inventor wishes to make clear, however, that the scope of this invention is intended to include any volume measuring means, including but not limited to digital, analogue, electrical, electronic, electro-mechanical, etc.

Trackball 92 and trackball movement detection means 100 were standard currently available computer peripherals embodied in such devices as computer mice and trackballs. Inclinometers 96 and 98 were conventional gravity-activated inclinometers with electrical outputs.

Vertical leg extension measurement means 19 and horizontal leg extension measurement means 21 comprised a wire spool having a free wire end connected to an extreme of a leg whose extension was to be measured, spring-loaded in the retracted position, connected to a rotary distance measurement apparatus similar to measuring wheel travel detection means 11 combined with a measuring wheel 8. Vertical leg extension measurement means 19 and horizontal leg extension measurement means 21 were electrically connected to volume measurement means 11, whereby volume measurement means 11 was informed as to the size of the area embraced by vertical leg 4 and horizontal leg 6, and thus be able to measure the areas of cross sectional returns.

While preferred embodiments of the invention have been illustrated herein, it is to be understood that changes and variations may be made by those skilled in the art without departing from the spirit of the appending claims.

DRAWING ITEM INDEX 2 volume measurement apparatus
4 vertical leg
6 horizontal leg
8 measuring wheel
10 measuring wheel travel detection means
11 volume measurement means
12 origin
14 X axis
16 Y axis
18 Z axis
19 vertical leg extension measurement means
20 first sensor
21 horizontal leg extension measurement means
22 second sensor
24 third sensor
26 chair
27 chair side section
28 chair back
29 chair seat section
30 chair rear leg
32 chair front leg
34 chair central void
36 chair side intra-leg void
38 chair seat
40 chair rear intra-leg void
42 chair front intra-leg void
44 first sensor scan
46 first sensor return
48 second sensor scan
50 second sensor return
52 third sensor scan
54 third sensor return
56 chair side cross section return
58 chair seat cross section return
60 chair side volume
61 chair side volume increment
62 chair seat volume
63 chair seat volume increment
64 chair volume
66 addition signs
68 equal sign
70 arrow
80 alternate embodiment volume measurement apparatus
82 first leg
84 second leg
85 arrow
86 forward-looking sensor
88 sideward-looking sensor
90 rearward-looking sensor
92 trackball
94 hinge
96 first leg inclinometer
98 second leg inclinometer
100 trackball movement detection means
102 mode switch
104 scan window
106 scan window upper edge
108 scan window far edge
110 scan window lower edge
111 swivel scan volume
112 level
114 arrow
116 chair volume increments
118 forward window
120 sideward window
122 rearward window
124 forward return
126 arrow
128 rearward return

I claim:

1. A volume measurement apparatus comprising a first leg hingedly attached to a second leg, a first sensor disposed at an extreme of said first leg opposite said second leg, a second sensor disposed at an extreme of said second leg opposite said first leg, a third sensor disposed at an intersection of said first leg and said second leg, a volume measurement means electrically connected to the sensors, a trackball rotatably attached to said second leg, and a track ball movement detection means electrically connected to said trackball and to said volume measurement means.

2. The volume measurement apparatus of claim 1 further comprising a first leg inclinometer disposed on said first leg, and a second leg inclinometer disposed on said second leg, said first leg inclinometer and said second leg inclinometer being electrically connected to said volume measurement means.

3. The volume measurement apparatus of claim 2 wherein said volume measurement means is set to detect volume scans only within a scan window.

4. The volume measurement apparatus of claim 3 wherein said scan window comprises a scan window upper edge defined as a plane parallel to the horizontal extending from said first sensor, a scan window far edge defined as a plane perpendicular to the horizontal and to said scan window upper edge, and a scan window lower edge defined as a plane co-extensive with a surface upon which said volume measurement apparatus rests.

5. The volume measurement apparatus of claim 2 further comprising a mode switch electrically connected to said volume measurement means, whereby said volume measurement means is instructed to operate in a swivel or in a rolling mode.

6. The volume measurement apparatus of claim 1 further comprising an inclinometer disposed on one of the legs and electrically connected to said volume measurement means, a level, and a mechanical interlock mounted on said level engaging said first leg and said second leg, whereby an angle between said first leg and said level is always equal to an angle between said second leg and said level.

7. A volume measurement apparatus comprising a first leg attached to a second leg, a forward-looking sensor, a sideward-looking sensor, and a rearward-looking sensor disposed at an extreme of said first leg opposite said second leg, a forward-looking sensor, a sideward-looking sensor, and a rearward-looking sensor disposed at an extreme of said second leg opposite said first leg, a forward-looking sensor, a sideward-looking sensor, and a rearward-looking sensor disposed at an intersection of said first leg and said second leg, a volume measurement means electrically connected to the sensors, a trackball rotatably attached to said second leg, and a track ball movement detection means electrically connected to said trackball and to said volume measurement means.

8. The volume measurement apparatus of claim 7 wherein said sideward-looking sensors are instructed to scan a sideward window, said forward-looking sensors are set to scan a forward window parallel to said sideward window and displaced forward in a direction of travel of said volume measurement apparatus, and said rearward-looking sensors are set to scan a rearward window parallel to said sideward window and displaced backwards in a direction opposite a direction of travel of said volume measurement means.

9. The volume measurement apparatus of claim 8 wherein each said window comprises a window upper edge, a window far edge, and a window lower edge, each said window upper edge being defined as a plane parallel to the horizontal extending from the sensors disposed at an extreme of said first leg opposite said second leg, each said window far edge being defined as a plane perpendicular to the horizontal and to each said scan window upper edge, and each window lower edge being defined as a plane co-extensive with a surface upon which said volume measurement apparatus rests.

10. The volume measurement apparatus of claim 7 further comprising a first leg inclinometer disposed on said first leg, and a second leg inclinometer disposed on said second leg, said first leg inclinometer and said second leg inclinometer being electrically connected to said volume measurement means, said first leg being hingedly attached to said second leg.

11. The volume measurement apparatus of claim 7 further comprising an inclinometer disposed on one of the legs and electrically connected to said volume measurement means, a level, and a mechanical interlock mounted on said level engaging said first leg and said second leg, whereby an angle between said first leg and said level is always equal to an angle between said second leg and said level.

12. The volume measurement apparatus of claim 7 further comprising a mode switch electrically connected to said volume measurement means, whereby said volume measurement means is instructed to operate in a swivel or in a rolling mode.

13. A method of volume measurement by swiveling a volume measurement apparatus, said volume measurement apparatus comprising a first leg attached to a second leg, a first sensor disposed at an extreme of said first leg opposite said second leg, a second sensor disposed at an extreme of said second leg opposite said first leg, a third sensor disposed at an intersection of said first leg and said second leg, a volume measurement means electrically connected to the sensors, a trackball rotatably attached to said second leg, and a track ball movement detection means electrically connected to said trackball and to said volume measurement means, said method comprising the steps of:

A. Placing said volume measurement apparatus at a starting position where said trackball contacts a surface and said second leg is substantially perpendicular to said surface;

B. Swiveling said volume measurement apparatus until said first leg passes completely over an object whose volume is to be measured, such that the sensors will scan volume increments of the object embraced within said volume measurement apparatus vertical leg and said volume measurement apparatus horizontal leg at pre-set angular increments;

C. Figuring only volumes that all three said sensors report as solid; and

D. Summing the volume increments recorded during the scan.

14. The method of measuring volume of claim 13 wherein said volume measurement apparatus further comprises a mode switch electrically connected to said volume measurement means, and wherein said method comprises the initial step of setting said mode switch to "Swivel".

15. The method of measuring volume of claim 13 wherein said volume measurement apparatus comprises a forward-looking sensor, a sideward-looking sensor, and a rearward-looking sensor disposed at an extreme of said first leg opposite said second leg, a forward-looking sensor, a sideward-looking sensor, and a rearward-looking sensor disposed at an extreme of said second leg opposite said first leg, and a forward-looking sensor, a sideward-looking sensor, and a rearward-looking sensor disposed at an intersection of said first leg and said second leg, and wherein said method comprises a final step of subtracting a volume of voids scanned by said forward-looking sensors or by said rearward-looking sensors from said sum of volume increments recorded during the scan.

16. A method of volume measurement by rolling a volume measurement apparatus, said volume measurement apparatus comprising a first leg attached to a second leg, a forward-looking sensor, a sideward-looking sensor, and a rearward-looking sensor disposed at an extreme of said first leg opposite said second leg, a forward-looking sensor, a sideward-looking sensor, and a rearward-looking sensor disposed at an extreme of said second leg opposite said first leg, a forward-looking sensor, a sideward-looking sensor, and a rearward-looking sensor disposed at an intersection of said first leg and said second leg, a volume measurement means electrically connected to the sensors, a trackball rotatably attached to said second leg, and a track ball movement detection means electrically connected to said trackball and to said volume measurement means, said method comprising the steps of:

A. Placing said volume measurement apparatus at a starting position where said trackball contacts a rolling surface;

B. Rolling said volume measurement apparatus past an object whose volume is to be measured, such that the sideward-looking sensors will scan cross sectional areas of the object embraced within said volume measurement apparatus vertical leg and said volume measurement apparatus horizontal leg at pre-set increments;

C. Figuring only an area that all three said sensors report as solid, which is an object cross section return;

D. Summing the products of the object cross section returns multiplied by said increment; and E. Subtracting a volume of voids scanned by said forward-looking sensors or by said rearward-looking sensors from said sum of products recorded during the scan.

17. The method of measuring volume of claim 16 wherein said volume measurement apparatus further comprises a mode switch electrically connected to said volume measurement means, and wherein said method comprises the initial step of setting said mode switch to "Roll".

* * * * *